United States Patent [19]

Oosaka et al.

[11] 4,378,562
[45] Mar. 29, 1983

[54] LIGHT BEAM SCANNING DEVICE

[75] Inventors: Shigenori Oosaka; Masashi Hirawata, both of Asaka, Japan

[73] Assignee: Fuji Photo Film Co., Ltd., Kanagawa, Japan

[21] Appl. No.: 165,443

[22] Filed: Jul. 2, 1980

[30] Foreign Application Priority Data

Jul. 3, 1979 [JP] Japan .................................. 54-84225

[51] Int. Cl.³ ............................................ G01D 15/14
[52] U.S. Cl. ..................................... 346/1.1; 346/108
[58] Field of Search ..................... 346/108, 76 L, 1.1, 346/109; 358/285, 293, 208; 350/6.6

[56] References Cited

U.S. PATENT DOCUMENTS 4,037,231 7/1977 Broyles et al. .................... 346/108
4,245,228 1/1981 Cook ................................. 346/108
4,251,126 2/1981 Minoura et al. ..................... 350/6.6

Primary Examiner—G. Z. Rubinson
Assistant Examiner—W. J. Brady
Attorney, Agent, or Firm—Sughrue, Mion, Zinn, Macpeak and Seas

[57] ABSTRACT

A light beam scanning device and method which a light beam scanned over a moving recording medium in a pattern of parallel scanning lines. The light beam is scanned in a reciprocating manner in a main scanning direction perpendicular to the direction of movement of the recording medium and perpendicular to an auxiliary scanning direction. The beam is deflected in the auxiliary scanning direction in synchronization with the reciprocal motion of the beam in the main scanning direction by an amount so as to produce a pattern of parallel scanning lines.

7 Claims, 6 Drawing Figures

LIGHT BEAM SCANNING DEVICE

BACKGROUND OF THE INVENTION

The present invention relates to light beam scanning devices using an oscillation type optical deflector. More particularly, the invention relates to a light beam scanning device which reciprocally scans a light beam in a parallel pattern.

Devices such as a rotary multi-surface mirrors, deflectors utilizing an acousto-optical effect, and galvanometer mirrors are currently in extensive use for deflecting laser beams. Among these devices, the galvanometer mirror is especially advantageous in that it is small in size, low in manufacturing cost, and simple in operation. However, techniques for scanning a light beam in a reciprocating manner using an oscillation type optical deflector such as a galvanometer mirror are disadvantageous in the following points. As shown in FIG. 1, a light beam 2 from a laser light source 1 is modulated by an optical modulator 3 and the light beam 2 thus modulated is scanned over a scanned surface such as a recording medium 5 by the reciprocal oscillation motion in the direction A of a galvanometer mirror 4. This is the main scanning operation. An auxiliary scanning operation is effected by moving the recording medium 5 in the direction B at a constant speed. In this case, recorded scanning lines $6_1$ and $6_2$ are not parallel to one another and therefore the recorded picture is very low in quality.

If only one of the "go" and "return" directions of the reciprocal oscillation motion is employed for the light scanning, then the resultant scanning lines are parallel to one another and the distance between adjacent scanning lines is constant. However, this method is still disadvantageous in that its scanning speed is low.

Accordingly, an object of this invention is to provide a reciprocating scanning type light beam scanning device in which the above-described difficulties have been eliminated.

SUMMARY OF THE INVENTION

The foregoing object and other objects of the invention have been achieved by the provision of a light beam scanning device in which a light beam is scanned in a reciprocating manner in a main scanning direction on a scanned surface by utilizing the reciprocal oscillation motion of an oscillation type optical deflector while the light beam or the scanned surface is moved at a constant speed in an auxiliary scanning direction substantially perpendicular to the main scanning direction. According to the invention, the light beam is deflected in the auxiliary scanning direction in synchronization with the reciprocal oscillation motion of the oscillation type optical deflector to thereby form scanning lines which are parallel to one another.

The term "oscillation type optical deflector" as herein used is intended to mean a device which is imparted oscillatory movement by an oscillating system such as a galvanometer or a bimorph element. The device used for deflecting the light beam in the auxiliary scanning direction in synchronization with the reciprocal oscillation movement of the oscillation type optical deflector is preferably an optical deflector utilizing an acousto-optical or electro-optical effect. However, it is not necessary that the device be limited thereto. It is necessary to provide a light beam modulator for a light beam scanning device in a recording operation. In this case, it is desirable to employ a light beam modulator utilizing an acousto-optical effect so that modulation and deflection can be performed with the same device.

DESCRIPTION OF THE PREFERRED EMBODIMENTS

A preferred embodiment of the invention will be described with reference to the accompanying drawings. First, the embodiment will be described referring to the broken lines in FIG. 1A which has been already referred to.

A modulator utilizing an acousto-optical effect, hereinafter referred to as "an A-O modulator" when applicable, is employed as the optical modulator 3 in the embodiment of FIG. 1A. The light beam 2 is modulated and deflected by the A-O modulator 3, as indicated by a light beam 2' in FIG. 1A, to form scanning lines $6_2'$ on the recording medium 5 in the "return" direction which are parallel to the scanning lines $6_1$ formed in the "going" direction. That is, when the galvanometer mirror 4 rotates in the "return" direction, the A-O modulator 3 correctively deflects the light beam 2 in a direction opposite to the direction B in step with the speed of movement in the direction B of the recording medium 5.

Figure 2A:
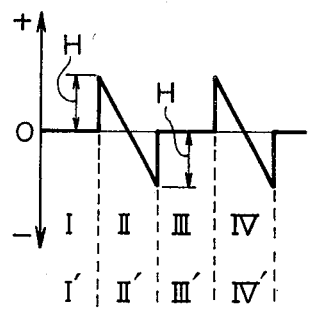
FIGS. 2A-2D are explanatory diagrams for a description of a corrective deflection technique using an auxiliary optical deflector.
Figure 2B:
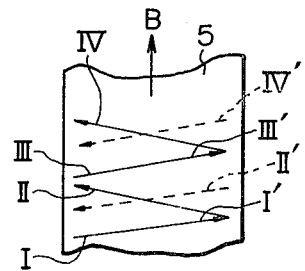
Figure 2C:
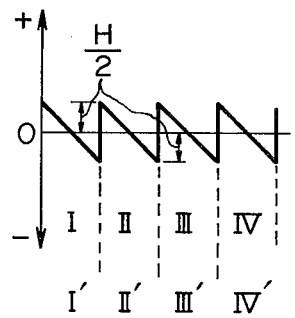
Figure 2D:
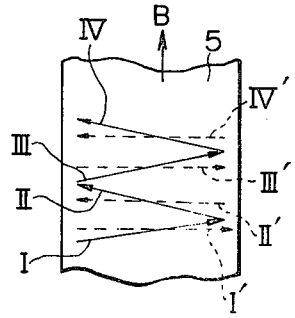

Referring to FIGS. 2A-2D, the corrective deflection method of the A-O modulator 3 will be described. FIGS. 2A and 2B are diagrams for a description of the corrective deflection operation of the A-O modulator 3. The vertical axis in both FIGS. 2A and 2C represents the amount of corrective deflection with the + sign indicating deflection in the direction B of movement of the recording medium 5 and the - sign indicating deflection in the opposite direction. The horizontal axis is a time axis along which is indicated the periods of time during which the scanning lines I, II, III and IV are formed. FIGS. 2C and 2D show scanning lines recorded on the recording medium 5. In FIGS. 2B and 2D, scanning lines I', II', III' and IV' as corrected by the A-O modulator are indicated by the broken lines while the scanning lines I, II, III and IV which have not corrected are indicated by the solid lines.

In the case illustrated in FIGS. 2A and 2B, the light beam is correctively deflected by the A-O modulator 3 as indicated in FIG. 2A only when the galvanometer mirror 4 rotates in the direction corresponding to the scanning lines II' and IV'. In other words, the amount of correction is zero for the scanning lines I and III but, for each of the scanning lines II and IV, the light beam is deflected substantially linearly in such a manner that the light beam is deflected in the positive direction by the scanning line interval H at the start of the scanning of the lines and it is deflected in the negative direction by the same scanning line interval H at the end of the scanning.

For the case of FIGS. 2C and 2D, corrective deflection is effected when the galvanometer mirror 4 is rotated not only in the one direction but also in the opposite direction. For each of the scanning lines, the light beam is linearly deflected in the positive direction by H/2 at the start and is deflected in the negative direction also by H/2 at the end (of the scanning) where H corresponds to the distance between adjacent parallel scanning lines.

The corrective deflection can be accomplished in a variety of different ways. In one preferred embodiment shown in FIG. 1B, a second galvanometer is coupled to the galvanometer used to scan the mirror 4 in the main scanning direction with the second galvanometer being arranged to deflect the mirror in the auxiliary scanning direction. A waveform is generated following the waveform shown in FIGS. 2A or 2C and applied to the input of the second galvanometer. The magnitude of the signal is adjusted to provide the necessary amount of deflection. The sawtooth waveform of FIG. 2A or FIG. 2C can be generated using any one of a number of well-known electronic circuits. The generation of the sawtooth waveform is to be synchronized with the scanning of the beam in the main scanning direction. This can be done by, for example, differentiating the waveform used to operate the galvanometer operating in the main scanning direction to form synchronizing pulses and using these pulses to synchronize the waveform generator.

Figure 3:
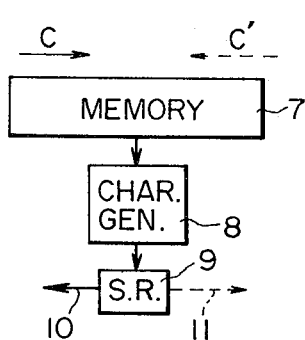
FIG. 3 is a block diagram of a logic circuit employed in a scanning system of the invention.

When data is both read and recorded using the described mode of reciprocal scanning, no registration problems are present if the reading operation is done in synchronism with the recording operation. In the case where the character code signals for each line are to be recorded and which have been previously stored in a memory, because the scanning direction is reversed for every other scanning line, it is necessary to provide a logic circuit as shown in FIG. 3 for rearranging the data to be recorded. A memory 7 is addressed for one line in the direction C for one scanning line then in the opposite direction C' for the next scanning line and the character code signal stored in the memory 7 is one by one loaded into a character generator 8. The character code signal is then inputted into a shift register 9 a line at a time. The character code signal in the shift register 9 is read out of the shift register beginning with the least significant bit 10 when the memory 7 is addressed in the direction C and beginning with the most significant bit 11 when the memory 7 is addressed in the direction C'.

Figure 1A:
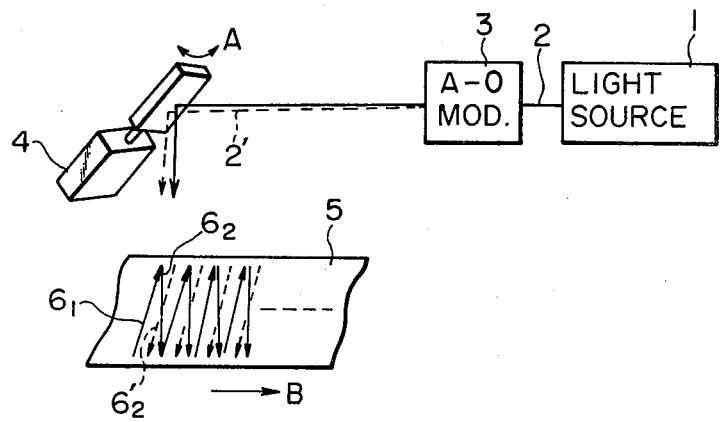
FIG. 1A is an explanatory diagram showing the difference between a conventional scanning system and a scanning system according to the present invention.
Figure 1B:
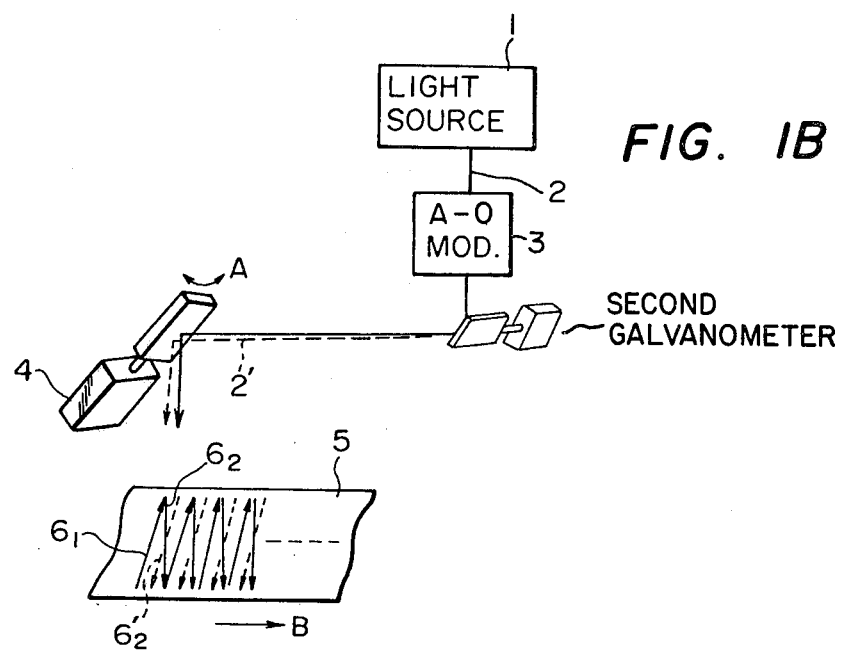
FIG. 1B is an explanatory diagram of one preferred embodiment of a scanning system according to the present invention.

While a light beam scanning device in which the scanned surface is moved as shown in FIGS. 1A and 1B has been described, it is believed evident that the technical concept of the invention can be applied as well to a light beam scanning device in which the scanned surface is maintained stationary and the light beam is scanned two-dimensionally and that, accordingly, a detailed description of such an embodiment need not be given. As illustrated in FIGS. 1A and 1B, the corrective deflection is carried out with an A-O modulator. However, the same effect can be obtained by providing a deflector for performing corrective deflection in the path of the light beam 2.

For the reciprocation scanning using an oscillation type optical deflector, the scanning lines are formed parallel to one another according to the invention making it possible to provide a picture of high quality in the reading or recording operation. In addition, according to the invention, the scanning can be carried out at a high speed because of the employment of reciprocal scanning. Furthermore, a light beam scanning device constructed in accordance with the invention is advantageous in that it can be manufactured at a low cost.

What is claimed is:

1. A method for scanning a light beam upon a recording medium to form a pattern of scanning lines which are parallel with one another comprising the steps of:
    moving said recording medium at a constant speed in an auxiliary scanning direction;
    scanning said light beam in a reciprocating manner upon said recording surface in a main scanning direction substantially perpendicular to said auxiliary scanning direction; and
    deflecting said light beam in a manner substantially parallel to said auxiliary scanning direction in a bi-directional fashion and in synchronization with the scanning of the light beam in said main scanning direction to an extent so as to produce a pattern of parallel scanning lines.

2. The method of claim 1 wherein said step of scanning said light beam in a reciprocating manner comprises deflecting said light beam with a mirror operatively coupled to a first galvanometer and wherein said step of deflecting said light beam in said auxiliary scanning direction comprises deflecting said mirror with a second galvanometer, said second galvanometer being coupled to a source of a sawtooth waveform signal, said sawtooth waveform signal being synchronized with the scanning of said light beam in said main scanning direction.

3. A device for scanning a light beam upon the surface of a recording medium in a pattern of parallel scanning lines comprising:
    means for moving said recording medium in an auxiliary scanning direction at a substantially constant speed;
    means for deflecting said light beam upon a surface of said recording medium in a main scanning direction substantially perpendicular to said auxiliary scanning direction; and
    means for deflecting said light beam in a manner substantially parallel to said auxiliary scanning direction in a bi-directional fashion and in synchronization with the reciprocal motion of said scanning means to an exent so as to form a pattern of parallel scanning lines.

4. The scanning device of claim 3 further comprising means for generating a sawtooth waveform, an output of said sawtooth waveform generating means being coupled to an operating input of said deflecting means.

5. A device for scanning a light beam upon the surface of a recording medium in a pattern of parallel scanning lines comprising:
    means for moving said recording medium in an auxiliary scanning direction at a substantially constant speed;
    means for deflecting said light beam upon a surface of said recording medium in a main scanning direction substantially perpendicular to said auxiliary scanning direction;
    means for deflecting said light beam in a manner substantially parallel to said auxiliary scanning direction in a bi-directional fashion and in synchronization with the reciprocal motion of said scanning means to an extent so as to form a pattern of parallel scanning lines;

means for generating a sawtooth waveform, an output of said sawtooth waveform generating means being coupled to an operating input of said deflecting means;

means for modulating said light beam, memory means for storing codes of characters to be recorded upon said recording medium, character generating means operating in response to an output of said memory means, and shift register means receiving output data from said character generator means, said shift register means shifting data out in a first direction for a first direction of scanning of said recording medium and in a second direction for a second direction of scanning of said recording medium.

6. The scanning device of claims 4 or 5 wherein said sawtooth waveform generating means produces a waveform having a peak amplitude corresponding to a deflection of said beam of the distance between adjacent parallel scanning lines and wherein a predetermined interval of time is provided between ramps of said sawtooth waveform.

7. The scanning device of claims 4 or 5 wherein said sawtooth waveform generating means produces an output waveform having a peak amplitude corresponding to a deflection of said beam of a distance half the spacing between adjacent parallel scanning lines.

* * * * *